United States Patent [19]

Harrell

[11] Patent Number: 5,197,126
[45] Date of Patent: Mar. 23, 1993

[54] CLOCK SWITCHING CIRCUIT FOR ASYNCHRONOUS CLOCKS OF GRAPHICS GENERATION APPARATUS

[75] Inventor: Chandlee B. Harrell, Mountain View, Calif.

[73] Assignee: Silicon Graphics, Inc., Mountain View, Calif.

[21] Appl. No.: 777,422

[22] Filed: Oct. 10, 1991

Related U.S. Application Data

[63] Continuation of Ser. No. 244,401, Sep. 15, 1988, abandoned.

[51] Int. Cl.[5] .............................................. G06F 15/20
[52] U.S. Cl. .................................... 395/200; 395/250; 395/550; 364/228; 364/228.5; 364/239; 364/239.9; 364/270; 364/270.3; 364/270.5; 364/DIG. 1
[58] Field of Search ... 364/200 MS File, 900 MS File; 395/200, 250, 800, 550, 775, 162, 163, 116; 340/747; 370/79, 85.9; 382/41

[56] References Cited

U.S. PATENT DOCUMENTS

| 3,753,232 | 8/1973 | Sporer | 364/200 |
|---|---|---|---|
| 3,980,993 | 9/1976 | Bredart et al. | 364/200 |
| 4,130,866 | 12/1978 | Ono | 364/200 |
| 4,143,418 | 3/1979 | Hodge et al. | 364/200 |
| 4,217,637 | 8/1980 | Faulkner et al. | 364/200 |
| 4,344,132 | 8/1982 | Dixon et al. | 364/200 |
| 4,613,936 | 9/1986 | Andresen | 364/200 |
| 4,651,277 | 3/1987 | Sakaji | 364/200 |
| 4,683,551 | 7/1987 | Schoon | 364/900 |
| 4,931,924 | 6/1990 | Kageura | 364/200 |
| 4,958,309 | 9/1990 | Turkal | 364/580 |
| 4,964,069 | 10/1990 | Ely | 364/521 |

*Primary Examiner*—Michael R. Fleming
*Assistant Examiner*—Gopal C. Ray
*Attorney, Agent, or Firm*—Blakely, Sokoloff, Taylor & Zafman

[57] ABSTRACT

A circuit is described for providing switching between two asynchronous clocking signals in a graphics generation apparatus. In transitioning from one clocking signal to the other, the ending clocking signal ends at the end of a complete cycle, and the beginning clocking signal begins at the beginning of a new cycle. There is dead time between the clocking signals long enough to prevent transients which could disturb the operation of the system. The clocking signals are used to control data transfers of a graphics processor within the graphics generation apparatus.

6 Claims, 2 Drawing Sheets

CLOCK SWITCHING CIRCUIT FOR ASYNCHRONOUS CLOCKS OF GRAPHICS GENERATION APPARATUS

This is a continuation of application Ser. No. 07/244,401, filed Sep. 15, 1988 now abandoned.

BACKGROUND OF THE INVENTION

1. Field of the Invention

The invention relates to the field of clocking signals for use with digital circuits, particularly graphics processors and the like.

2. Prior Art

Most typically, in digital computers an oscillator is used to provide timing signals or a plurality of synchronized timing signals which control the operation of components or elements in the computer. In some cases, certain components of the computer are able to operate at higher speeds than others, and an operational advantage can be obtained by operating the faster components at the faster rate. Controlling the operation of components that operate at different rates is a problem which must be overcome to obtain this advantage.

U.S. Pat. No. 4,677,433 discloses the operation of a microprocessor (8086) at one speed and a coprocessor at another speed. For the embodiment described in this patent, an 8086 microprocessor operates at a frequency of 10 MHz; the coprocessor (a numeric data processor, Intel Pat No. 8087-3) at a frequency of 5 MHz. The patent describes operating the 8086 at a lower frequency when the microprocessor is operating with the coprocessor, and operating the microprocessor at its higher rate at other times. In the case of this disclosure, both the higher and lower clock frequencies are synchronized. This makes the task of switching between clocking signals relatively simple.

Applicant believes there are many computers where different components operate at different frequencies; but generally, and particularly where the components need to directly interact, synchronized clocking/timing signals are used.

As will be seen with the present invention, a graphics processor and a frame buffer are operated at two different asynchronous clock rates. This presents special problems in switching from one clocking signal to the other.

SUMMARY OF THE INVENTION

An improved clocking circuit for use in a graphics generation apparatus is described. A graphics processor receives a first and a second asynchronous clocking signals, the first signal being at a higher frequency than the second signal. In the presently preferred embodiment, the graphics processor executes instructions (e.g., run instructions, filling instructions) at the higher clock rate and communicates pixel data to a frame buffer at this higher rate. The graphics processor operates at the lower rate when communicating with a host computer and when being used as an interface for direct memory access (DMA) transfers between the host computer and the frame buffer.

The invention teaches switching from the first clocking signal to the second clocking signal such that the first clocking signal ends at the end of a full cycle of the first clocking signal and the second clocking signal begins at the beginning of a full cycle of the second clocking signal. The switching circuit provides a delay (dead time) between the end of the first clocking signal and the beginning of the second clocking signal, this dead time being equal to at least one period of the first clocking signal. Similarly, when switching between the second clocking signal and the first clocking signal, the circuit assures that the second clocking signal ends at the end of a full cycle and that the first clocking signal begins at the beginning of a full cycle. There is also a dead time provided between the end of the second clocking signal and the beginning of the first clocking signal which is at least as long as one cycle of the first clocking signal. The dead time in fact can be equal to the cycle period of the faster clocking signal plus the synchronization time.

Other aspects of the present invention will be apparent from the following detailed description of the invention.

DETAILED DESCRIPTION OF THE PRESENT INVENTION

An improvement in the operation of a graphics generation apparatus particularly one having a graphics processor is described. More particularly, the present invention is directed toward the use of two different asynchronous clocking signals which are used to control data transfers with the graphics processor at different times.

In the following description, numerous specific details are set forth such as specific frequencies, in order to provide a thorough understanding of the present invention. It will be obvious, however, to one skilled in the art that the present invention may be practiced without these details. In other instances, well-known circuits are shown in block diagram form in order not to unnecessarily obscure the present invention in detail.

Figure 1:
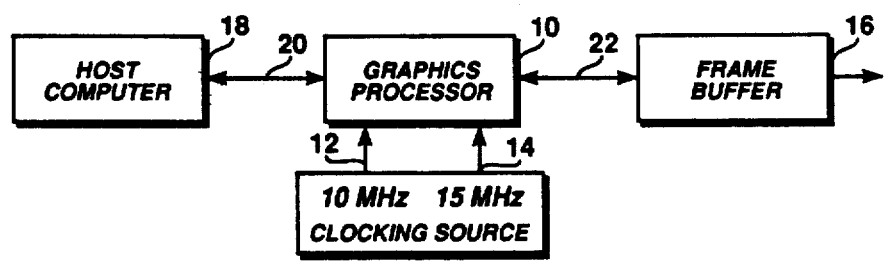
FIG. 1 is a block diagram illustrating a graphics processor (which receives two different asynchronous clocking signals) and its interconnection with a host computer and frame buffer.

Referring first to FIG. 1, a general block diagram of a graphics generation apparatus is illustrated which includes a graphics processor 10. The graphics processor communicates with the host computer 18 over a bus 20. The processor also communicates with a frame buffer 16 over a bus 22. In the currently preferred embodiment the graphics generation apparatus operates at two different rates. Thus, the processor 10 is coupled to a source of a 10 MHz and 15 MHz (asynchronous) timing signals through lines 12 and 14, respectively.

The host computer 18 cannot operate at as high a clock frequency as the processor 10. For example, the host frequency may communicate instructions to the processor 10 at a 10 MHz rate. The processor 10 is able to execute these instructions and provide pixel data to frame buffer 16 at a higher rate, for example, 15 MHz. Since much of the operation of the graphics generation apparatus involves the execution of instructions by the processor 10, there is a substantial advantage to operating this processor 10 at the higher rate as much of the time as possible. During some operations it is necessary for the host computer 18 to transfer data directly to the frame buffer 16 in a direct memory access (DMA) mode. This requires the processor 10 to operate at the 10 MHz rate, and for the buffer 10 to receive data from the computer 18 at this rate.

Accordingly, for optimal operation the processor 10 must be switched between the 10 MHz clocking signal and 15 MHz clocking signal. These signals are asynchronous and hence, if switching simply occurs from one to the other, incomplete cycles of one clocking signal or the other may occur, or narrow pulses may appear in the clocking signal stream. This can cause numerous problems in the processor 10 and other circuits such as the buffer 16 which may be operating under the control switched clocking signal.

Figure 3:
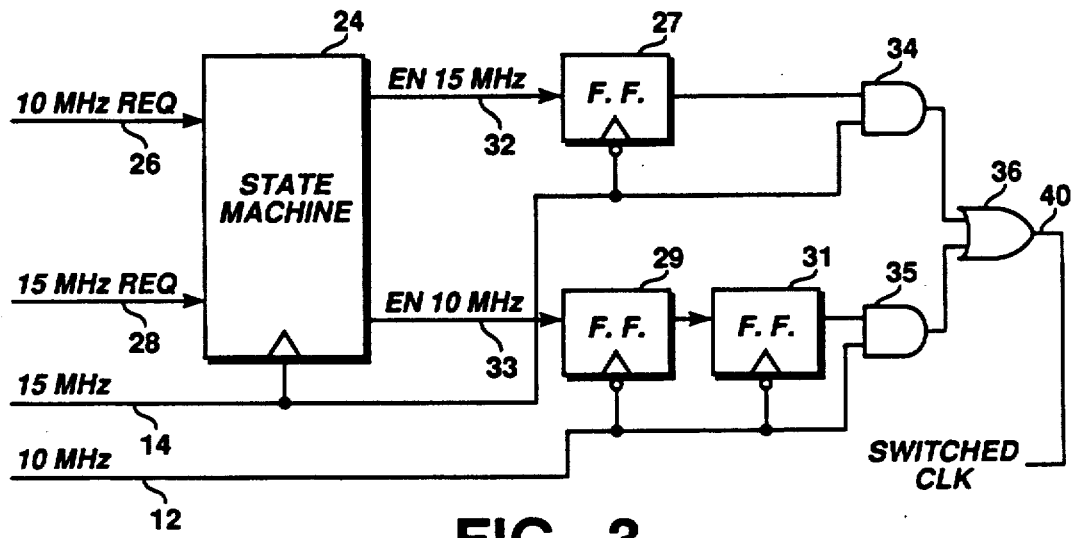
FIG. 3 is a block diagram of an electrical circuit illustrating the currently preferred embodiment of the present invention.

The block diagram of FIG. 3 illustrates the currently preferred embodiment of the circuit used to provide switching between the two clocking signals. In the currently preferred embodiment, this circuitry, except for gates 34, 35 and 36, are contained within the processor 10. The output of the circuit provides the switched clocking signal on line 40 which is used by the graphics processor 10, and other components within the graphics generation apparatus such as to the frame buffer 16.

The circuit of FIG. 3 receives request signals which request operations at either the 10 MHz rate (on line 26) or at the 15 MHz rate (line 28). While two lines are shown, it will be appreciated that a single line may be used with the binary state of the signal on the single line indicating which of the two clocking signals is requested. The 15 MHz clocking signal is coupled to the circuit on line 14 and the 10 MHz clocking signal is coupled to the circuit on line 12.

The state machine 24 receives and processes the request signals and provides two enable signals, an enable 15 MHz signal on line 32 and an enable 10 MHz signal on line 33. In the currently preferred embodiment, the state machine 24 is operated at the 15 MHz rate. The operation of the state machine 24 as it applies to the current invention is described in conjunction with FIG. 4. The state diagram of FIG. 4 may be implemented with any one of a plurality of wellknown circuits.

The enable 15 MHz signal on line 32 is coupled to the input of a D-type flip-flop 27. The output of this flip-flop is coupled to one input terminal of an AND gate 34. The clock terminal of the flip-flop 27 receives a 15 MHz clocking signal. This input is inverted and hence, the flip-flop is clocked on the trailing edge of the clocking signal. The 15 MHz signal is coupled to the other terminal of the AND gate 34. Thus, when the output of the flip-flop 27 is high, the 15 MHz clocking signal passes through the AND gate 34.

The enable 10 MHz signal on line 33 is coupled through two D-type flip-flops 29 and 31. Each of these D flip-flops are clocked by the 10 MHz clocking signal; again, this signal is inverted and hence, both flip-flops 29 and 31 are clocked on the trailing edge of the 10 MHz signal. The output of the flip-flop 31 is connected to one input of the AND gate 35. The other input to the AND gate 35 receives the 10 MHz clocking signal. Thus, when the output of flip-flop 31 is high, the 10 MHz clocking signal is gated by the AND gate 35.

The outputs of the AND gates 34 and 35 are coupled to the input terminals of the OR gate 36. The final switched clocking signal is provided at the output of the gate 36 on line 40.

Assume first that the 15 MHz signal request signal on line 28 is high and that the output of gate 36 is the 15 MHz signal. The waveforms associated with this steady state condition are shown in the lefthand portion of FIG. 2A. The 15 MHz signal on line 14 is shown as waveform 14a; the 10 MHz signal on line 12 is shown as waveform 12a; the 15 MHz enable signal on line 32 is shown as waveform 32a; and the output waveform on line 40 is shown as waveform 40a. For the conditions illustrated (prior to time 41), the output of flip-flop 27 is high and hence, the 15 MHz t signal is passed through the AND gate 34. And, assuming a steady state condition has been attained, both flip-flops 29 and 31 provide low outputs, therefore the 10 MHz signal is blocked at gate 35. This condition is also shown in the state diagram of FIG. 4 as state 62 and since the 15 MHz request is present, the loop 63 assures the continuous presence of the 15 MHz enable signal.

Figure 4:
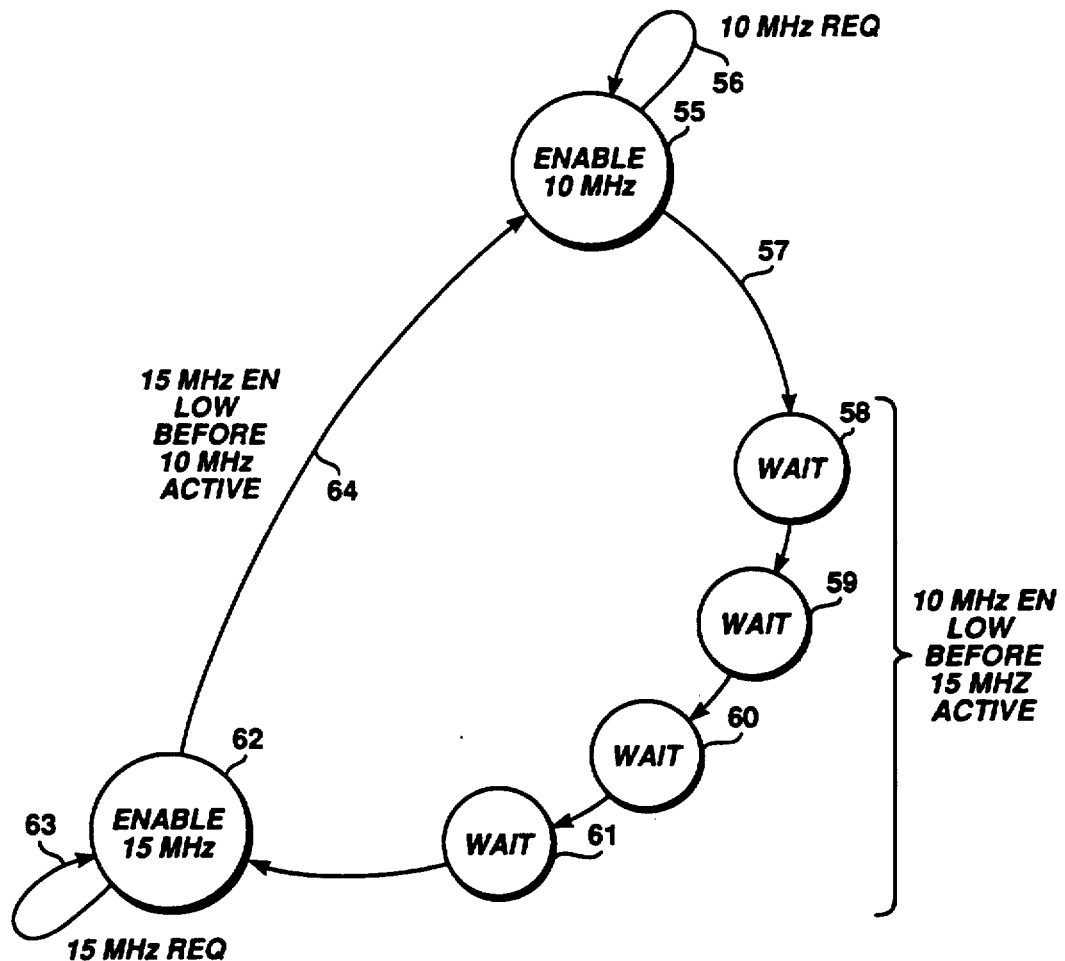
FIG. 4 is a state diagram used to describe a part of the circuit of FIG. 3.

Assume next that at time 41 there is a request on line 26 for the 10 MHz signal. (It is assumed that there is sufficient time between time 41 and the leading edge of the 15 MHz signal for a set up to occur in the circuit receiving the enable signal.) At the leading edge of the 15 MHz signal following time 41 the 15 MHz enable signal drops in potential and the 10 MHz enable signal rises in potential as indicated by the line 42. This is indicated in FIG. 4 as the transition from state 62 to state 55 along the path 64. The flip-flop 27, however, does not change state until half a cycle later of the 15 MHz clock. On the next trailing edge of the 15 MHz signal the output of the flip-flop 27 drops, thereby blocking the 15 MHz signal from the switched clocking line 40. This is indicated by line 43 in FIG. 2A. On the next trailing edge of the 10MHz signal, following time 41, the 10MHz MHz enable signal is clocked into the flip-flop 29. On the next trailing edge of the 10 MHz signal (time 44) this enable signal is clocked to the output of the flip-flop 31. Therefore, at this time the gate 35 will pass the 10 MHz signal, except that at time 44 the 10 MHz signal is in its low state. On the next leading edge of the 10 MHz signal as indicated by line 45 the signal on line 40 rises in potential and the 10 MHz signal is coupled from line 12 to line 40. As long as the 10 MHz request signal is present on line 26 the state machine remains in state 55 (loop 56) keeping the enable 10 MHz signal high or active and the 15 MHz enable signal low or inactive.

Figure 2A:
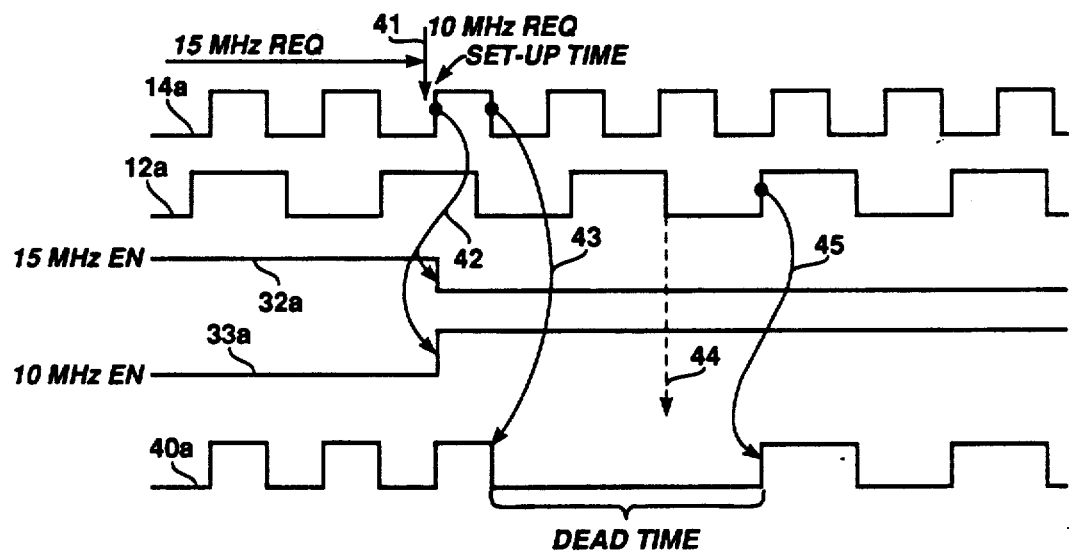
FIG. 2A illustrates clocking and control signals and is used to describe the present invention when switching from a first clocking signal to a second clocking signal.

Importantly, it should be noted from FIG. 2A that the 15 MHz signal on line 40 ended with a full cycle; that is, the 15 MHz wavefrom was not shortened Following the end of the 15 MHz signal, there was a dead time before the 10 MHz signal began. The 10 MHz signal begins with a full cycle; specifically, there is no shortening of any of the waveforms associated with the 10 MHz signal. The dead time which is approximately equal to the period of time necessary for the 10 MHz enable signal to be clocked through flip-flops 29 and 31 is at least as long and in fact longer than the period of the faster of the two clocking signals, the 15 MHz clock. This prevents switching from one frequency to another in a short period of time. If this occurred it would create a pulse which if considered periodic, would be faster than the 15 MHz signal and perhaps too fast for the circuit to react to, thereby causing problems.

In the currently preferred embodiment flip-flop 29 is "trailing edge" clocked. It will be apparent that this flip-flop could be leading edge triggered. All the flip-flops could be leading edge triggered, if for example, the clocking signals are inverted. Other alterations to the circuit will be obvious to one skilled in the art.

In the embodiment of FIG. 3, two flip-flops 29 and 31 are used for passing the 10 MHz enable signal. This is done because the time at which the 10 MHz enable signal occurs is not synchronized with the 10 MHz clocking signal. Therefore, the set up time requirements for a flip-flop may not be met and a meta-stable state might occur. The use of two flip-flops prevents such a condition from propagating through to the gate 35 and thereby preventing unwanted transients on line 40.

Figure 2B:
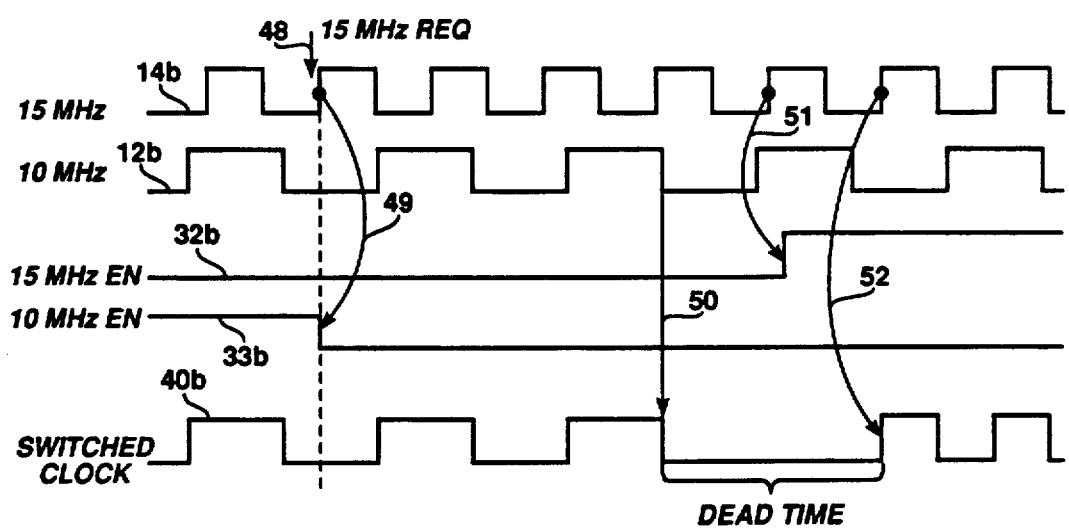
FIG. 2B illustrates clocking and control signals and is used to describe the present invention when switching from the second clocking signals to the first clocking signal.

Assume that the circuit of FIG. 3 is in a steady state condition with the 10 MHz request present on line 26. The waveforms for this condition are shown on the lefthand portion of FIG. 2B. The 15 MHz enable signal 32b is in its low state, and the 10 MHz enable signal 33b is in its high state. Assume now that the 15 MHz request signal occurs at time 48. When the state machine senses this request, the 10 MHz enable signal on line 33 drops in potential as indicated by line 49. (This condition is shown in FIG. 4. The request on line 28 terminates the loop 56 and ends the state 55; on the leading edge of the 15 MHz signal following time 48 there is a transfer as indicated by line 57 to state 58. States 58, 59, 60 and 61 each represent a single "wait" of the 15 MHz clock. During these four states, both enable signals are low as indicated by waveforms 32b and 33b of FIG. 2B.)

At time 50, the low signal on line 33 has propagated through the flip-flops 29 and 31, cutting off the 10 MHz signal from line 40. There then follows a dead time on line 40. On the fifth leading edge of the 15 MHz signal following time 48 the 15 MHz enable signal rises in potential as indicated by lines 51. This enable signal is then clocked through the flip-flop 27 on the next trailing edge of the 15 MHz signal. On the very next leading edge of the 15 MHz signal, 15 MHz signal begins to appear on the line 40 as indicated by line 52.

In the transition from the 10 MHz signal to the 15 MHz signal, there is no shortening of the 10 MHz signal before it ended. The 15 MHz signal began on a complete cycle with no shortening of any of its periods. The dead time between the end of the 10 MHz signal and the beginning of the 15 MHz signal is long enough to assure that no pulses occurred which are shorter than the period of the 15 MHz clock.

The transitions from one clocking signal to the other are typically infrequent when compared to the number of clock cycles which occur between transitions. That is, for example, once the host computer requests a DMA transfer to the frame buffer and interrupts 15 MHz operations of the graphics processor, the 10 MHz clock is used to control the DMA transfer and such transfer occurs over a relatively long period of time when compared to the dead time associated with the transition from the 15 MHz clock to the 10 MHz clock. Therefore, having dead time a bit longer than needed does not degrade performance.

Thus, a circuit has been described which is useful in switching between two asynchronous clocking signals in a graphics generation apparatus.

I claim:

1. A graphics generation apparatus comprising:
a graphics processor being coupled to receive from a clock source a first and a second asynchronous clocking signal wherein the rising edge of said first clocking signal and the rising edge of said second clocking signal are not correlated with some reference to time;

said graphics processor being coupled through a first bus to a frame buffer of said graphics generation apparatus such that said processor can communicate data with said frame buffer of said graphics generation apparatus at said frequency of said first clocking signal, said graphics processor being coupled through a second bus to a host computer of said graphics generation apparatus such that data can be communicated between said host computer and said frame buffer through said graphics processor at said frequency of said second clocking signal; and circuit means for providing switching between said first and second clocking signals such that said circuit means prevents the formation of clocking signals which have a period, (i) shorter than the period of said first clocking signal when switching from said second clocking signal to said first clocking signal and, (ii) shorter than the period of said second clocking signal when switching from said first clocking signal to said second clocking signal;

said circuit means preventing said shorter periods by providing a first dead time in the clocking signals when switching from said first clocking signal to said second clocking signal and by providing a second dead time when switching from said second clocking signal to said first clocking signal.

2. A graphics generation apparatus comprising:
a graphics processor being coupled to receive from a clock source a first and a second asynchronous clocking signal wherein the rising edge of said first clocking signal and the rising edge of said second clocking signal are not correlated with some reference to time, said first clocking signal being higher in frequency than said second clocking signal;

said graphics processor being coupled through a first bus to a frame buffer of said graphics generation apparatus such that said processor can communicate data with said frame buffer of said graphics generation apparatus at said frequency of said first clocking signal, said graphics processor being coupled through a second bus to a host computer of said graphics generation apparatus such that data can be communicated between said host computer and said frame buffer through said graphics processor at said frequency of said second clocking signal; and circuit means for providing switching between said first and second clocking signals, said circuit means having gating means for preventing the generation of clocking signals having periods shorter than the period associated with said first clocking signal when switching between said clocking signals.

3. A graphics generation apparatus comprising:
a graphics processor being coupled to receive from a clock source a first and a second asynchronous clocking signal wherein the rising edge of said first clocking signal and the rising edge of said second clocking signal are not correlated with some reference to time, said first clocking signal being higher in frequency than said second clocking signal:

said graphics processor being coupled through a first bus to a frame buffer of said graphics generation apparatus such that said processor can communicate data with said frame buffer of said graphics generation apparatus at said frequency of said first clocking signal, said graphics processor being coupled through a second bus to a host computer of said graphics generation apparatus such that data can be communicated between said host computer and said frame buffer through said graphics processor at said frequency of said second clocking signal; and circuit means for providing switching from said first clocking signal to said second clocking signal such that said first clocking signal ends at the end of a full cycle of said first clocking signal and said second clocking signal begins at the beginning of a full cycle of said second clocking signal, there being a first dead time between the end of said first clocking signal and the beginning of said second clocking signal, said dead time being equal to at least one period of said first clocking signal, and for switching from said second clocking signal to said first clocking signal such that said second clocking signal ends at the end of a full cycle of said second clocking signal and said first clocking signal begins at the beginning of a full cycle of said first clocking signal, there being a second dead time between the end of said second clocking signal and the beginning of said first clocking signal, said dead time being equal to at least one period of said first clocking signal.

4. The improvement defined by claim 3 wherein said second dead time is equal to a plurality of periods of said first clocking signal.

5. The improvement defined by claim 3 wherein said circuit means generates a first enable signal which enables said first clocking signal and a second enable signal which enables said second clocking signal and wherein said first enable signal is clocked through a first flip-flop on a trailing edge of said first clocking signal, and said second enable signal is clocked through a second flip-flop on a trailing edge of said second clocking signal.

6. The improvement defined by claim 5 wherein said second enable signal is clocked through a third flip-flop on said trailing edge of said second clocking signal, said third flip-flop being coupled to the output of said second flip-flop. a

* * * * *